United States Patent Office 2,722,527
Patented Nov. 1, 1955

2,722,527
DISAZO DYESTUFFS

Walter Wehrli, Riehen, near Basel, and Jakob Benz, Basel, Switzerland, assignors to Sandoz A. G., Basel, Switzerland No Drawing. Application June 28, 1954,
Serial No. 439,919

Claims priority, application Switzerland July 9, 1953

6 Claims. (Cl. 260—153)

The present invention relates to substantive disazo dyestuffs.

Valuable substantive disazo dyestuffs are obtained by replacing, on the one hand, a halogen atom of a six-membered triazine compound which contains at least two and at most three replaceable halogen atoms bound to carbon atoms, by the radical of the aminodisazo compound from diazotized 4-amino-1,1'-azobenzene-3,4'-disulfonic acid and 2-amino-5-hydroxynaphthalene-7-sulfonic acid, which aminodisazo radical is coupled in ortho-position to the hydroxyl group, and, on the other hand, replacing the remaining halogen atom or one of the two remaining halogen atoms by the radical of an aminobenzene which is substituted by a water-solubilizing group, such for example as the sulfonic acid group, the carboxyl group, a sulfonic acid amide group which may be substituted at the nitrogen atom, or an alkylsulfonyl group, and if desired replacing the third halogen atom— if a third halogen atom is present—by the hydroxyl group or by a primary, secondary or tertiary amino group, the said replacement operations being carried out in any desired order of succession.

An alternative mode of procedure comprises coupling diazotized 4-amino-1,1'-azobenzene-3,4'-disulfonic acid with a triazine compound of the formula

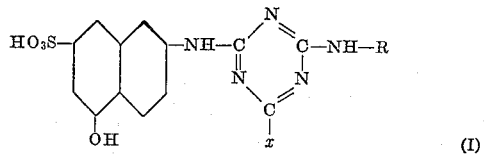

(I)

wherein $x$ stands for methyl, phenyl, halogen, hydroxyl or a primary, secondary or tertiary amino group, and R stands for a radical of the benzene series containing a water-solubilizing group such as for example the sulfonic acid group, the carboxyl group, a sulfonic acid amide group which may be substituted at the nitrogen atom, or an alkylsulfonyl group. When $x$ stands for halogen, this halogen atom may in the obtained disazo dyestuff be replaced by the hydroxyl group or by a primary, secondary or tertiary amino group.

Illustrative of six-membered triazine compounds containing at least two and at most three replaceable halogen atoms bound to carbon atoms, which may be used in carrying out the first aforedescribed process embodiment, are for example 1-methyl-3,5-dichlorotriazine, 1-phenyl-3,5-dichlorotriazine, cyanuric bromide and, especially, cyanuric chloride. The reaction of the triazine compounds containing the replaceable halogen atoms is advantageously carried out in aqueous medium and in the presence of an acid-binding agent, such for example as lithium- or sodium- or potassium-hydroxide or -carbonate or -bicarbonate or -acetate.

The aminodisazo compound specified as starting compound in the first process embodiment can be very readily obtained by coupling diazotized 4-amino-1,1'-azobenzene-3,4'-disulfonic acid with a 2-acylamino-5-hydroxynaphthalene-7-sulfonic acid in neutral to weakly acid medium, separating the by-product which is coupled in the 8-position of the naphthalene nucleus, and then saponifying the acylamino group to the amino group.

The aminobenzenes substituted by a water-solubilizing group, which are used as starting materials in the aforesaid first process embodiment and the residue of which is indicated as R—NH— in Formula I, are advantageously chosen from the series of the aminobenzene sulfonic acids, aminobenzene carboxylic acids, aminobenzene sulfonic acid amides which may be further substituted by aliphatic, carbocyclic or heterocyclic radicals at the nitrogen atom of the sulfonic acid amide group, and aminoalkylsulfonylbenzenes. Preferred compounds in this category are 1-aminobenzene-3-sulfonic acid, 1-aminobenzene-4-sulfonic acid, 1-aminobenzene-3-carboxylic acid, 1-aminobenzene-4-carboxylic acid, 1-aminobenzene-3-sulfonic acid amide, 1-aminobenzene-4-sulfonic acid amide, 1-amino-3-methylsulfonylbenzene, and 1-amino-4-methylsulfonylbenzene. Aminobenzenes which, in addition to the aforedefined water-solubilizing groups, also carry additional substituents, such for example as halogen or alkyl, are also suitable in preparing the dyestuffs of the present invention. The water-solubilizing group facilitates the reaction of the aminobenzene with the triazine compound. Where the water-solubility of the aminobenzene is only slight, such compound can be added to the aqueous condensation mass in the form of a solution in a water-miscible organic solvent, such for example as acetone.

For the reaction with the optionally-present third halogen atom of the triazine compound, according to the first and second aforedescribed process embodiments, use may suitably be made of primary or secondary aliphatic amines which may be substituted by halogen or hydroxyl, or of primary or secondary carbocyclic or heterocyclic amines which, if desired, may be further substituted. Illustrative of such amines are for example the aforementioned aminobenzenes, and also methylamine, dimethylamine, ethylamine, 2-hydroxyethylamine, di-(2-hydroxy-ethyl)-amine, propylamine, 3-hydroxypropylamine, butylamine, amylamine, hexylamine, benzylamine, cyclohexylamine, morpholine, aminobenzene, 1-amino-3-chlorobenzene, 1-amino-4-chlorobenzene, 1-amino-3-methylbenzene, 1-amino-4-methylbenzene, 1-amino-4-methoxybenzene, 1-amino-4-acetylaminobenzene, 1-amino-dimethylbenzenes, N-methylaminobenzene, N-ethylaminobenzene and 1- or 2-aminonaphthalenesulfonic acids. The here-enumerated amines also occur as residues in Formula I when $x$ has the corresponding significance.

The triazine compounds of Formula I, which form the basis of the aforedescribed second process embodiment, are obtained by replacing, on the one hand, one halogen atom of a six-membered triazine compound, which contains at least two and at most three replaceable halogen atoms bound to carbon atoms, by the 2-amino-5-hydroxynaphthalene-7-sulfonic acid radical and, on the other hand, replacing the remaining halogen atom or one of the remaining halogen atoms by the radical of an aminobenzene which is substituted by a water-solubilizing group, and if desired replacing the third halogen atom— if a third halogen atom is present—by hydroxyl, amino or the radical of a primary or secondary aliphatic, carbocyclic or heterocyclic amine which may be substituted, the replacement operations being carried out in any desired order of succession.

The substantive disazo dyestuffs according to the present invention correspond to the formula

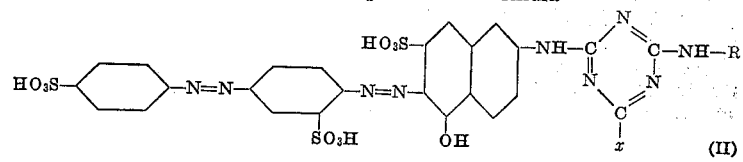

(II)

wherein x and R have the previously indicated significances. These dyestuffs are distinguished by the vividness of the shade of their dyeings. They dye cotton and fibers of regenerated cellulose in scarlet to red shades of good fastness to light, to washing and to perspiration.

The following examples set forth typical representative embodiments of the invention, and are intended to be wholly illustrative and not at all limitative in character. In the said examples, the parts and the percentages are by weight. The temperatures are degrees centigrade.

EXAMPLE 1

60.7 parts of aminodisazo compound—obtained by coupling diazotized 4-amino-1,1'-azobenzene-3,4'-disulfonic acid with 2-acetylamino-5-hydroxynaphthalene-7-sulfonic acid in weakly acid medium, separating the by-product which is coupled in the 8-position, and then saponifying the acetylamino group to the amino group—are dissolved in 400 parts of water with the addition of alkali to maintain the solution neutral. The resultant solution is slowly added to a suspension of 18.4 parts of cyanuric chloride in 300 parts of ice water, and the condensation mass is stirred for 1½ to 2 hours at 0–3°, the reaction of the mass being maintained weakly acid throughout this operation by the dropwise addition of a dilute aqueous sodium carbonate solution. The suspension of the thus-formed primary condensation product is heated to 25°, after which there is added a solution—heated to 80°—of 17.2 parts of 1-aminobenzene-3-sulfonic acid amide in 150 parts of water. The mass is then warmed to 45° for one hour, care being taken to maintain the pH of the mass at all times between 5.5 and 6.5 by the dropwise addition of a dilute sodium carbonate solution. To the resultant solution of the now-present secondary condensation product, 20 parts of aminobenzene are added, the mass heated to 95° for 1½ hours, and then a solution of 10 parts of sodium hydroxide in 30 parts of water added to the thus-obtained solution of the resultant ternary condensation product. The disazo dyestuff is precipitated by the addition of sodium chloride to the alkaline condensation solution, after which the precipitated disazo dyestuff is filtered off and is dried. It corresponds to the formula triazine compound obtained by the stepwise condensation, after the manner of the preceding paragraph, of a cyanuric trihalide with 2-amino-5-hydroxynaphthalene-7-sulfonic acid, 1-aminobenzene-3-sulfonic acid amide and aminobenzene, and separating the by-product which is coupled in the 8-position.

Dyestuffs with similar properties are obtained when in either or both of the afore-described processes the 20 parts of the aminobenzene are replaced by the equivalent quantity of cyclohexylamine, di-(2-hydroxyethyl)-amine, methylamine, octylamine, morpholine, 1-amino-4-methoxybenzene, 1-amino-4-ethylbenzene or 1-amino-4-methylsulfonylbenzene. Thus, the disazo dyestuff wherein aminobenzene is replaced by 1-amino-4-methoxybenzene, corresponds to the formula

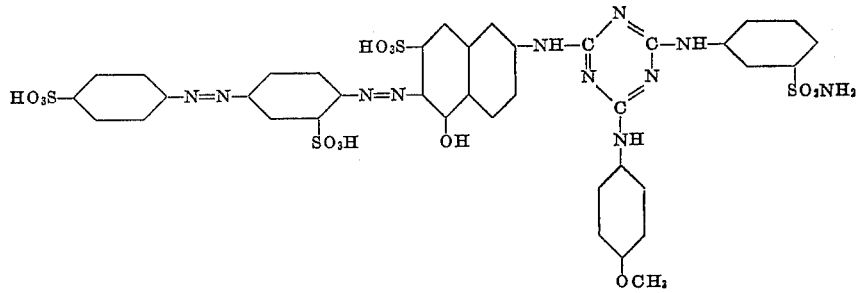

EXAMPLE 2

A neutral solution of 17.3 parts of 1-aminobenzene-4-sulfonic acid in 80 parts of water are run, at 0–3° and in the course of 30 minutes, into a suspension of 18.4 parts of cyanuric chloride in 200 parts of water. By the dropwise addition of a dilute aqueous sodium carbonate solution, care is taken that the reaction of the condensation medium remains weakly acid throughout. The mass is stirred for another hour at 0–3°. Then the suspension is heated to 40°; at this temperature and in the course of 30 minutes, there is added to the suspension a neutral solution of 23.9 parts of 2-amino-5-hydroxynaphthalene-7-sulfonic acid in 400 parts of water, the reaction being kept weakly acid by the dropwise addition of dilute aqueous sodium carbonate solution. The mass is then stirred for 30 more minutes under the indicated conditions. Finally, 20 parts of aminobenzene are added and the reaction mass is then heated to 90–95° for 2 hours. The reaction mass is then adjusted to weak alkalinity by the addition of sodium carbonate, after which it is filtered and the filter cake washed with dilute aqueous sodium chloride solution. 58.0 parts of the thus-obtained pure ternary condensation product are dissolved in 600 parts of water, the solution being maintained neutral by the addition of sodium carbonate. After the addition of 10 parts of sodium bicarbonate, the diazo compound of 35.7 parts of 4-amino-1,1'-azobenzene-3,4'-disulfonic acid is added to the solution, and

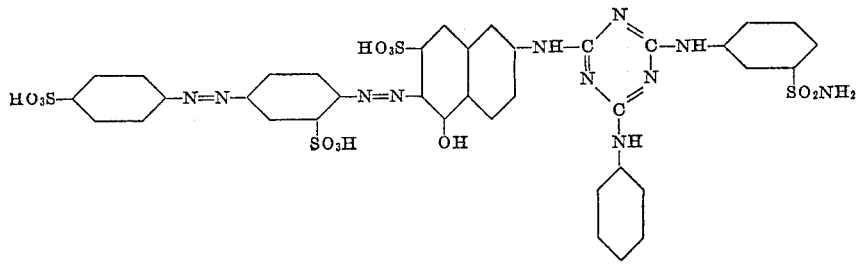

and is a red powder which dyes cotton and fibers of regenerated cellulose in vivid red shades of good fastness to light, to washing and to perspiration.

The identical product is obtained by coupling diazotized 4-amino-1,1'-azobenzene-3,4'-disulfonic acid in weakly acid, neutral or weakly alkaline medium with the the mass is stirred until the coupling which ensues is ended. The reaction mass is then heated to 60–80°, the produced disazo dyestuff is salted out and filtered off. By reprecipitation, the said disazo dyestuff is completely freed from a blue by-product, after which the disazo dyestuff is dried. It corresponds to the formula

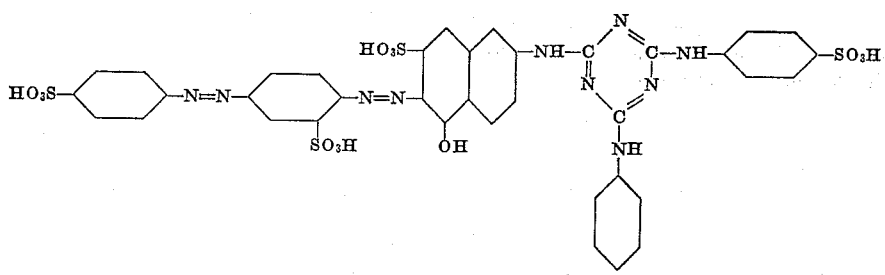

and is a red powder which dyes cotton and fibers of regenerated cellulose in vivid red shades with good fastness to light, to washing, and to perspiration. The identical dyestuff is obtained by condensing one mol of the aminodisazo dyestuff disclosed in Example 1, one mol of 1-aminobenzene-4-sulfonic acid and one mol of aminobenzene with one mol of cyanuric chloride.

The following table exemplifies additional disazo dyestuffs which can be prepared according to one of the foregoing examples. The dyestuffs correspond to Formula II, supra. The table sets forth the amine corresponding to the R—NH— residue, and the substituents corresponding to the symbol $x$. Where $x$ stands for the residue of an amine, the amine itself is recited for the sake of simplicity. The last column of the table finally sets forth the shade of the respective dyeings on cotton.

Table

| (1) Example No. | (2) R—NH— | (3) —$x$ | (4) Shade of Dyeing on Cotton |
|---|---|---|---|
| 3 | 1-aminobenzene-4-carboxylic acid. | aminobenzene | red. |
| 4 | 1-aminobenzene-3-carboxylic acid. | cyclohexylamine | red. |
| 5 | 1-aminobenzene-3-sulfonic acid. | octylamine | red. |
| 6 | 1-aminobenzene-4-sulfonic acid amide. | ----do---- | red. |
| 7 | ----do---- | 1-amino-4-methylbenzene. | red. |
| 8 | ----do---- | —NH$_2$ | red. |
| 9 | ----do---- | di-(2'-hydroxyethyl-amide. | red. |
| 10 | ----do---- | morpholine | red. |
| 11 | ----do---- | 1-amino-4-methoxybenzene. | red. |
| 12 | 1-aminobenzene-3-sulfonic acid-methylamide. | aminobenzene | red. |
| 13 | ----do---- | 1-aminobenzene-3-sulfonic acid-methylamide. | red. |
| 14 | 1-amino-3-methyl-sulfonylbenzene. | aminobenzene | red. |
| 15 | 1-aminobenzene-3-sulfonic acid-dimethylamide. | ----do---- | red. |
| 16 | 1-amino-3-phenyl-sulfonylbenzene. | ----do---- | red. |
| 17 | 1-aminobenzene-3-sulfonic acid. | N-methylamino-benzene. | red. |
| 18 | 1-aminobenzene-4-sulfonic acid-(2'-hydroxy)-ethylamide. | aminobenzene | red. |
| 19 | 1-aminobenzene-4-sulfonic acid-(2'-carboxy)-phenylamide. | ----do---- | red. |
| 20 | 1-aminobenzene-4-sulfonic acid amide. | 1-amino-4-methyl-sulfonylbenzene. | red. |

Representative examples are 12 and 14. The formulae of the thus-obtained dyestuffs are:

EXAMPLE 12

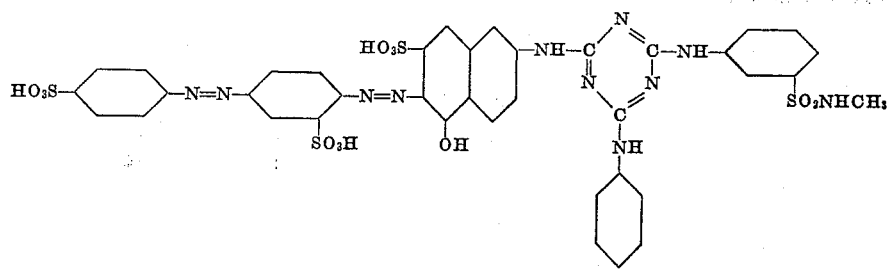

EXAMPLE 14

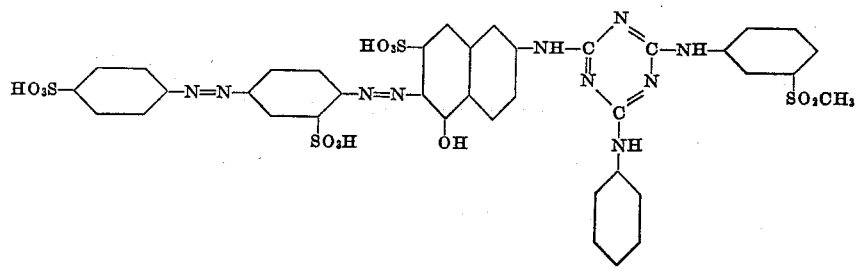

EXAMPLE 21

1 part of the disazo dyestuff obtained according to Example 2 is dissolved in 3000 parts of water; to this solution 5 parts of Glauber's salt are added. The resultant dyebath is heated to 50° and, at this temperature, 100 parts of cotton are entered. The dyebath is then heated to 95° in the course of 15–20 minutes, and is maintained at this temperature for 15 minutes. 5–15 additional parts of Glauber's salt are then added and the dyeing continued at 95° for about 30 minutes. The bath is then allowed to cool to 50°, and the dyed material withdrawn, thoroughly rinsed and dried. There is thus obtained a dyeing of outstanding fastness to light and of good fastness to wet treatments.

Fibers of regenerated cellulose can be dyed in similar manner.

Having thus disclosed the invention, what is claimed is:

1. A substantive disazo dyestuff which corresponds to the formula

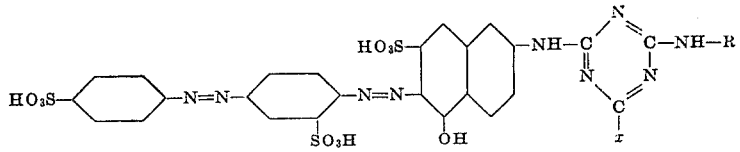

wherein $x$ stands for a member selected from the group consisting of primary amino, secondary amino and tertiary amino groups and R stands for a radical of the benzene series containing a water-solubilizing group.

2. The substantive disazo dyestuff corresponding to the formula

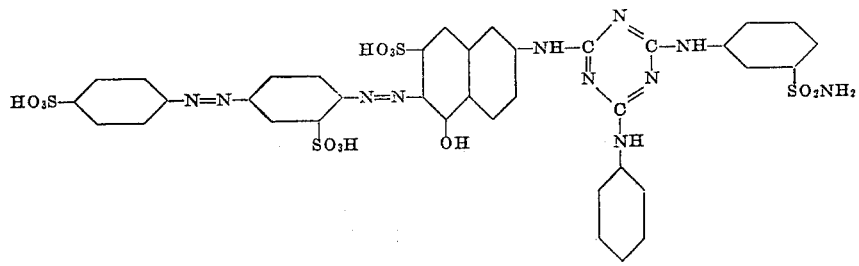

3. The substantive disazo dyestuff corresponding to the formula

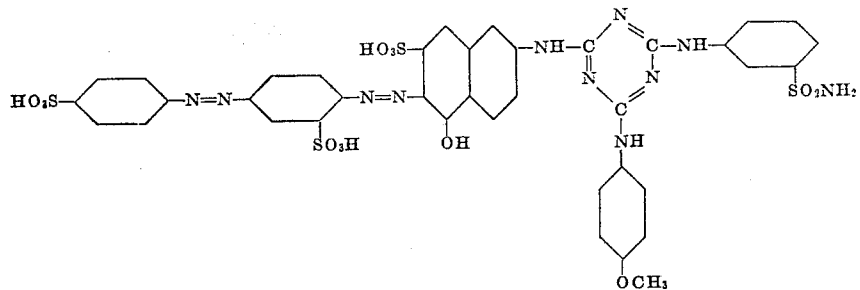

4. The substantive disazo dyestuff corresponding to the formula

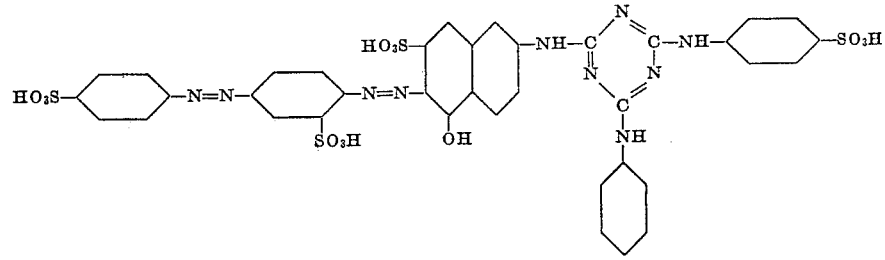

5. The substantive disazo dyestuff corresponding to the formula.

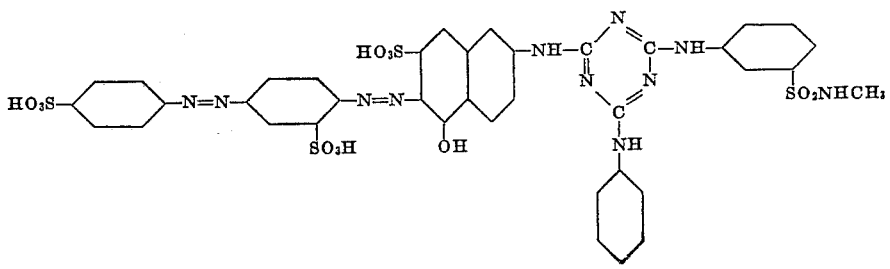

6. The substantive disazo dyestuff corresponding to the formula
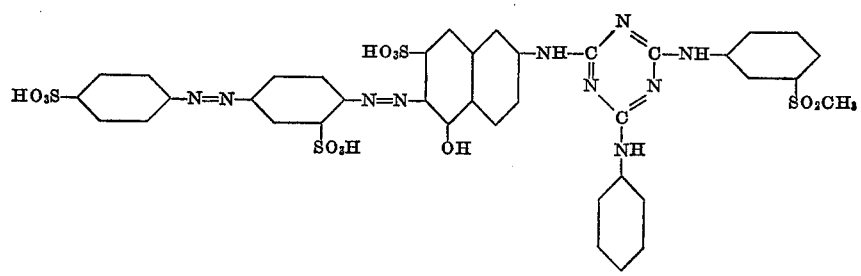
No references cited.